3,265,591
SEPARATION OF BUTADIENE FROM BUTENES BY DISTILLING IN THE PRESENCE OF AN AQUEOUS SOLUTION OF SILVER SALTS
Ronald Harry Halliwell, Parkersburg, W. Va., assignor to E. I. du Pont de Nemours and Company, Wilmington, Del., a corporation of Delaware
Filed Nov. 15, 1962, Ser. No. 237,934
6 Claims. (Cl. 203—33)

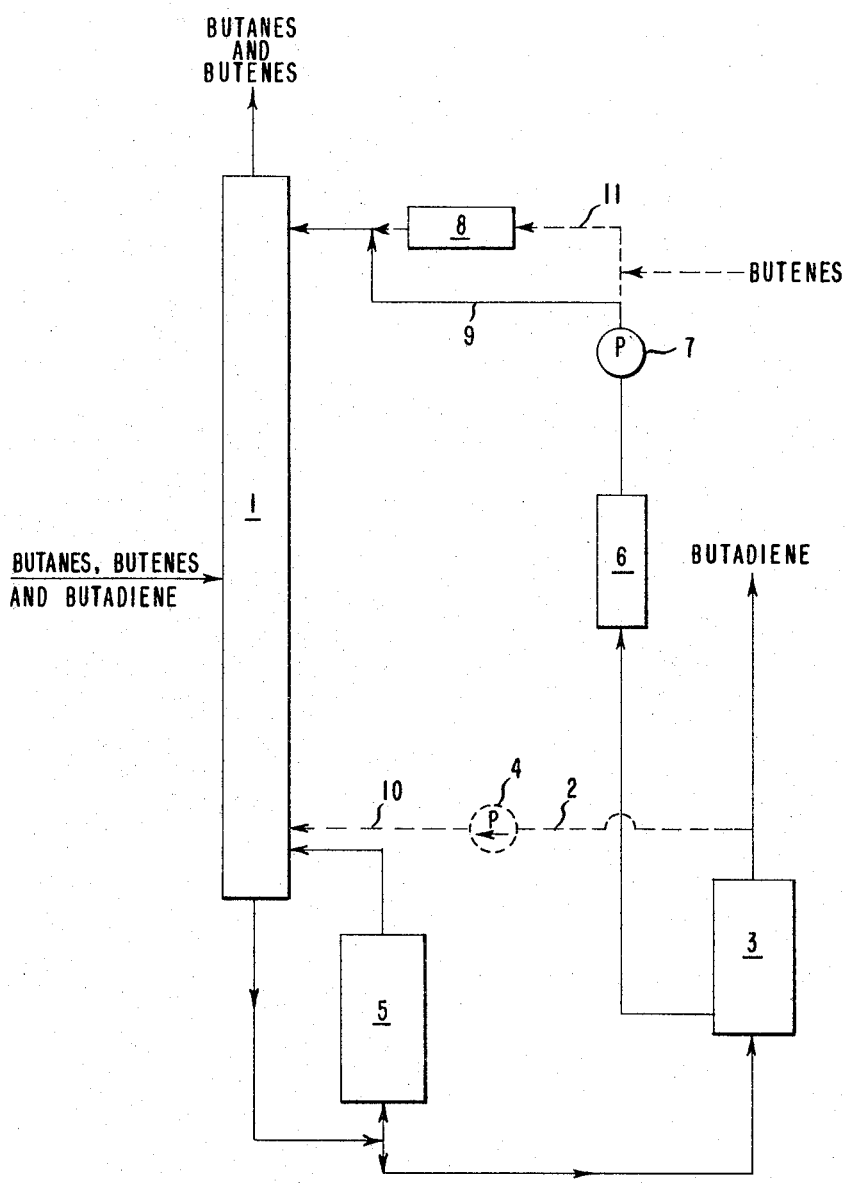

The present invention relates to the separation of butane, butenes and butadienes, and, more specifically, to the separation of butadiene from mixtures with butenes and butanes by extractive distillation techniques.

It had heretofore been known that saturated hydrocarbons could be separated from unsaturated hydrocarbons by selected adsorption of the unsaturated hydrocarbons using aqueous solutions of silver fluoborate or silver fluosilicate, see U.S. 2,913,505, issued November 17, 1959 to Van Raay et al., and that the effectiveness of such separations could be increased by the use of combinations of silver fluoborates or fluosilicates with fluoborates or fluosilicates of metals in Group II of the Periodic Table of Elements, see U.S. 3,007,981, issued November 7, 1961 to Baker and Knaack.

In accordance with the present invention, it was discovered that butadiene can be separated from close boiling mixture of butadiene, butenes and butanes by a process which comprises introducing said mixture into a distillation column maintained at a temperature above the boiling point of said mixture and below 120° C., and preferably maintained at 25 to 45° C., passing a one to six molar aqueous solution of a silver salt selected from the class consisting of silver fluoborates and silver fluosilicates through said column, recovering butanes and butenes from the head of said column, separately heating said aqueous solution after contact with said hydrocarbon mixture at a temperature above 100° C. and recovering butadiene released by said heating. If desirable, the mixture of butanes and butenes recovered from the head of the column can be further separated into butanes and butenes using the procedures outlined in the patents above mentioned. Upon recovery of the butadiene from the silver salt solution, the silver salt solution is preferably cooled and recirculated to the head of the column. Saturation of the salt solution with butene prior to entry into the column may be desirable. The temperatures employed in the distillation column and in the stripper can be widely varied depending on how the process is carried out. Thus, it is even possible to employ higher temperatures in the distillation column than in the stripper by combining the higher temperatures in the column with pressures higher than in the stripper.

The mixtures separated by the process of the present invention comprise mixtures of butanes, butenes in all isomeric forms and butadiene. It was known heretofore that butanes are not absorbed by the aqueous salt solutions and, thus, would pass through a column as described above without effect. The process of the present invention is based on the discovery, however, that the affinity of the silver salts for the butadiene is greater than that of the butene and that the complex formed by the silver salts with the butadiene is more stable than that formed with butenes. This relationship is not affected by the presence of minor quantities of olefins of higher or lower carbon content. The process can be employed to separate mixtures containing only small quantities of butadiene as well as mixtures of high butadiene concentration. It is preferable to remove acetylenes from the mixture to be separated since acetylene reacts with the silver ion to form hazardous silver acetylides which precipitate from the solution thereby decreasing the silver concentration and the efficiency and safety of the process.

The preferred concentration of the silver salt is, as indicated, one to six molar. The upper concentration limit is critical since at concentrations in excess of about six molar, the butadiene/silver complex is insoluble and precipitates out of solution. Although the precipitation of the butadiene/silver complex at concentrations above six molar can be employed as a method for separating butadiene from butenes, such a technique is not the basis of the process of the present invention and, on the contrary, it is essential to maintain the concentration below six molar. Although the extractive distillation of butadiene mixtures using these silver salts could be operated at concentrations below one molar, the process is not economic at such concentrations, and, as a matter of fact, it is desirable to operate the process as close as possible to the upper concentration limit.

The process of the present invention is further illustrated by the attached schematic drawing. A mixture of butadiene, butanes and butenes is fed to the extractive distillation column 1 through which the silver salt solution saturated with butene is circulating. The butadiene replaces butene in the downward flowing salt solution stream. Butanes and butenes present in the feed mixture are recovered from the head of the column. In order to recover high purity butadiene, it is necessary to operate the lower portion of the column as an enriching section (with respect to butadiene; or as a stripping section with respect to butenes). This can be done in at least two ways; a reboiler 5 can be installed at the bottom of the column to generate butadiene vapor which then passes up the column countercurrent to the flow of salt solution and displaces butenes absorbed in the salt solution; or a portion of the recovered butadiene can be returned to the base of the column 1 via compressor 4 through lines 2 and 10 and made to pass up the column countercurrent to the flow of salt solution so as to displace butenes absorbed in the salt solution. In the latter case, the reboiler may be eliminated and all the salt solution from the bottom of the column may pass directly to the butadiene stripper 3. The butadiene complex solution, either directly from the column or from the reboiler, is decomposed in the stripper 3 resulting in uncomplexed silver salt solution and butadiene which is recovered. The stripped silver salt solution can then be passed through cooler 6 and pumped back by means of pump 7 through line 9 to the extractive distillation column 1. In order to minimize the generation of heat in the upper portion of the column due to the absorption of olefins and diolefins, it is possible to presaturate and recool the salt solution entering the top of the column. This can be accomplished by adding butenes to the salt solution leaving the first cooler 6 via line 11 and then passing the salt solution now containing butenes through a second cooler 8 before admitting the salt solution to the top of the extractive distillation column. Presaturating the salt solution with butenes also has a corollary benefit of reducing the loss of butadiene in the butane and butene stream leaving the top of the column. The design and operation of the column will vary depending on the nature of the mixture separated and the temperature at which it is desired to carry out the extractive distillation. Generally, the relative volatility of the butenes to butadiene at mole ratios of silver to both hydrocarbons of four and greater, is above four so that a simple column with few plates is sufficient to obtain a satisfactory degree of separation. The column may be operated at atmospheric or elevated pressures. Although subatmospheric pressures can also be used, such do not appear to be so economically attractive.

The invention is further illustrated by the following example.

EXAMPLE

Through a 141 inch long, ⅜ inch I.D. jacketed glass column containing a 304 SS wire spiral was pumped a 5.75 molar solution of silver fluoborate at a rate 11.0 cc./min. by means of a Pulsafeeder pump. The temperature of the column was maintained at about 35° C. A mixture of 49.3 mole percent butadiene, 7.4 mole percent butene-2, 7.5 mole percent butene-1, and 35.8 mole percent isobutene was fed into the column half-way up the column at a rate of 45 cc./min. The solution leaving the base of the column was passed into a round bottom flask serving as the reboiler which was maintained at a temperature of 84 to 86° C. Butenes were recovered from the head of the column. From the reboiler, the solution was allowed to flow to a round bottom flask in which the butadiene was stripped from the solution. The temperature of the butadiene stripper was maintained at 110 to 112° C. From the stripper, the silver salt solution was cooled and fed back to the pump recirculating the solution. Butadiene obtained from the stripper was passed through a condenser. The reflux ratio of the column was 3.82:1. The reflux ratio was calculated as the ratio of hydrocarbons in the silver salt solution to the hydrocarbons in the column off-gas. The column off-gas was found to contain 96.6 mole percent of butenes and 3.4 percent of butadiene. The stripper off-gas was found to contain 98.7 mole percent of butadiene and 1.3 mole percent of butenes.

The separation of butadiene from mixtures thereof with butenes and butanes has been specifically illustrated with silver fluoborate. It is to be understood that essentially similar results are obtained when silver fluoborate is replaced with silver fluosilicate or a mixture of silver fluoborate and silver fluosilicate. Additionally, the efficiency of the system can be improved by the use of mixtures of these silver salts with fluoborates or fluosilicates of Group II metals. Various modifications in the particular technique illustrated in the separation of butadiene from mixtures thereof with butenes and butanes using the aforementioned silver salts will be apparent to one skilled in the art and are not to be considered as excluded from the scope of this invention. Thus, it will be apparent that the process can be operated at varying pressures in the column and in the stripper, for example, and that such pressure differences may be employed to increase the efficiency of the separation.

I claim:

1. Method for the separation of butadiene from mixtures thereof with butenes which comprises introducing said mixture into a distillation column maintained at a temperature above the boiling point of said mixture and below 120° C., passing an aqueous solution of a silver salt selected from the group consisting of silver fluoborate, silver fluosilicate and mixtures thereof, said silver salt being employed in a concentration of about one to six molar, through the column, recovering butenes from the head of said column, and removing the aqueous solution of a silver salt after contact with said mixture from said column, heating said aqueous solution to a temperature above 100° C., and recovering the butadiene released by said heating.

2. The method of claim 1 wherein said hydrocarbon mixture also contains butanes.

3. The method of claim 1 wherein the silver salt is silver fluoborate.

4. The method of claim 1 wherein the silver salt solution is recirculated to said column.

5. The method of claim 1 wherein a mixture of the said silver salt with a salt selected from the class consisting of fluoborates and fluosilicates of metals of Group II of the Periodic Table of Elements is employed.

6. The method of claim 4 wherein the silver salt solution is saturated with butene before recirculation to said column.

References Cited by the Examiner

UNITED STATES PATENTS

| | | | |
|---|---|---|---|
| 2,391,404 | 12/1945 | Friedman et al. | 260—677 |
| 2,471,550 | 5/1949 | Shaw | 260—677 |
| 2,523,681 | 9/1950 | Cole | 260—677 |
| 2,696,464 | 12/1954 | Mathis et al. | |
| 2,913,505 | 11/1959 | Van Raay et al. | 260—677 |
| 3,007,981 | 11/1961 | Baker et al. | 260—677 |

NORMAN YUDKOFF, *Primary Examiner.*

W. L. BASCOMB, *Assistant Examiner.*